(12) United States Patent
Werner et al.

(10) Patent No.: US 7,218,214 B2
(45) Date of Patent: May 15, 2007

(54) AUXILIARY SAFETY LIGHT SYSTEM

(75) Inventors: David R. Werner, 34 Church St., Pittsford, NY (US) 14534; Wayne R. Palmiter, Rochester, NY (US); David Zima, Oostburg, WI (US)

(73) Assignee: David R. Werner, Fairport, NY (US)

( * ) Notice: Subject to any disclaimer, the term of this patent is extended or adjusted under 35 U.S.C. 154(b) by 103 days.

(21) Appl. No.: 10/973,594

(22) Filed: Oct. 26, 2004

(65) Prior Publication Data

US 2005/0162265 A1 Jul. 28, 2005

Related U.S. Application Data

(60) Provisional application No. 60/514,849, filed on Oct. 27, 2003.

(51) Int. Cl.
*B60Q 1/26* (2006.01)
(52) U.S. Cl. .................... 340/468; 340/571.2
(58) Field of Classification Search ............... 340/468, 340/571.2, 432, 464, 475, 479
See application file for complete search history.

(56) References Cited

U.S. PATENT DOCUMENTS

| | | | |
|---|---|---|---|
| 4,204,191 A | 5/1980 | Daniels | |
| 4,559,516 A | 12/1985 | Schott et al. | |
| 4,648,131 A | 3/1987 | Kawaguchi et al. | |
| 4,760,373 A | 7/1988 | Reilly | |
| 4,769,629 A | 9/1988 | Tigwell | |
| 4,792,882 A | 12/1988 | Guevremont | |
| 4,891,736 A | 1/1990 | Gouda | |
| 4,896,138 A | 1/1990 | Nickols | |
| 4,956,752 A | 9/1990 | Foglietti | |
| 5,040,099 A | 8/1991 | Harris | |
| 5,072,209 A | 12/1991 | Hori et al. | |
| 5,353,008 A | 10/1994 | Eikenberry et al. | |
| 5,477,209 A | 12/1995 | Benson, Jr. | |
| 5,704,707 A | 1/1998 | Gebelein | |
| 5,739,750 A | 4/1998 | Drake | |
| 5,910,764 A | 6/1999 | Hayden | |
| 6,017,049 A | 1/2000 | Spector | |
| 6,099,150 A | 8/2000 | Hsiao | |
| 6,157,298 A | 12/2000 | Garfinkel et al. | |
| 6,320,499 B1 | 11/2001 | Wang | |

(Continued)

OTHER PUBLICATIONS

Printed web pages from www.riderlight.com, for the riderlight (TM) wireless brake light system for motorcycles. Feb. 28, 2005, 2 pages.

(Continued)

*Primary Examiner*—Jeffery Hofsass
*Assistant Examiner*—Shirley Lu
(74) *Attorney, Agent, or Firm*—Patent Innovations LLC; John M. Hammond

(57) ABSTRACT

A safety lighting system comprising an H-field backscatter generator adapted to receive at least one electrical signal indicating the application of electrical power to at least one light circuit and comprising means for encoding and transmitting at least one encoded signal; a magnetic coupling receiver located separately from the H-field backscatter generator and adapted to receive the first encoded signal; and a light display electrically connected to the magnetic coupling receiver, the light display comprising at least one illuminatable lamp.

21 Claims, 9 Drawing Sheets

U.S. PATENT DOCUMENTS

| | | |
|---|---|---|
| 6,325,521 B1 * | 12/2001 | Gregg et al. ................ 362/106 |
| 6,348,859 B1 | 2/2002 | Baker |
| 6,406,168 B1 * | 6/2002 | Whiting ..................... 362/473 |
| 6,459,726 B1 | 10/2002 | Ovard et al. |
| 6,466,771 B2 | 10/2002 | Wood, Jr. et al. |
| 6,538,567 B2 | 3/2003 | Stewart |
| 6,600,905 B2 | 7/2003 | Greeff et al. |
| 2002/0145865 A1 | 10/2002 | Gregg |

OTHER PUBLICATIONS

Printed web pages from www.asiapacific.com.my/signalfly, for the Signalfly wireless brake light system for motorcycles. Feb. 28, 2005, 9 pages.

* cited by examiner

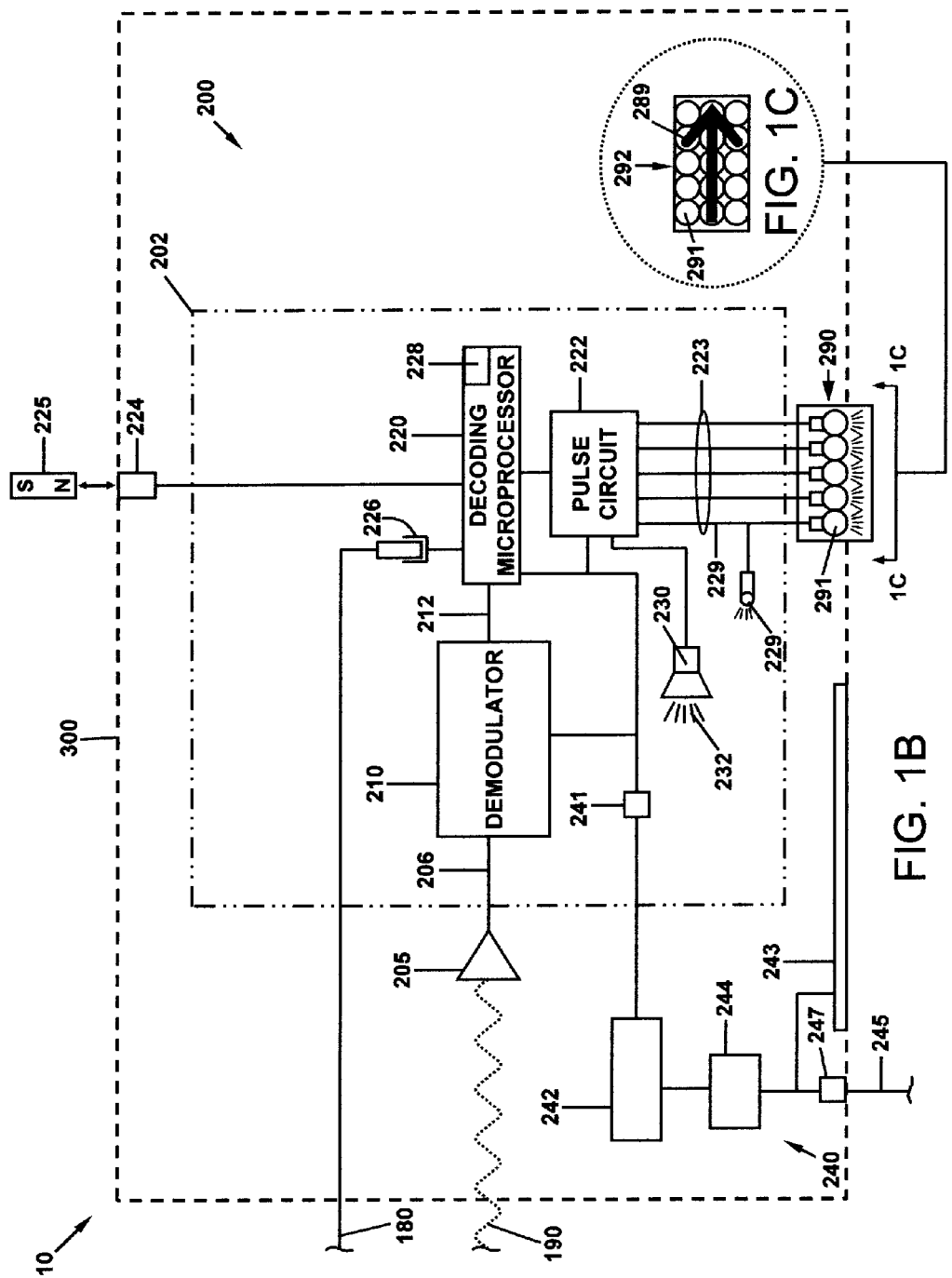

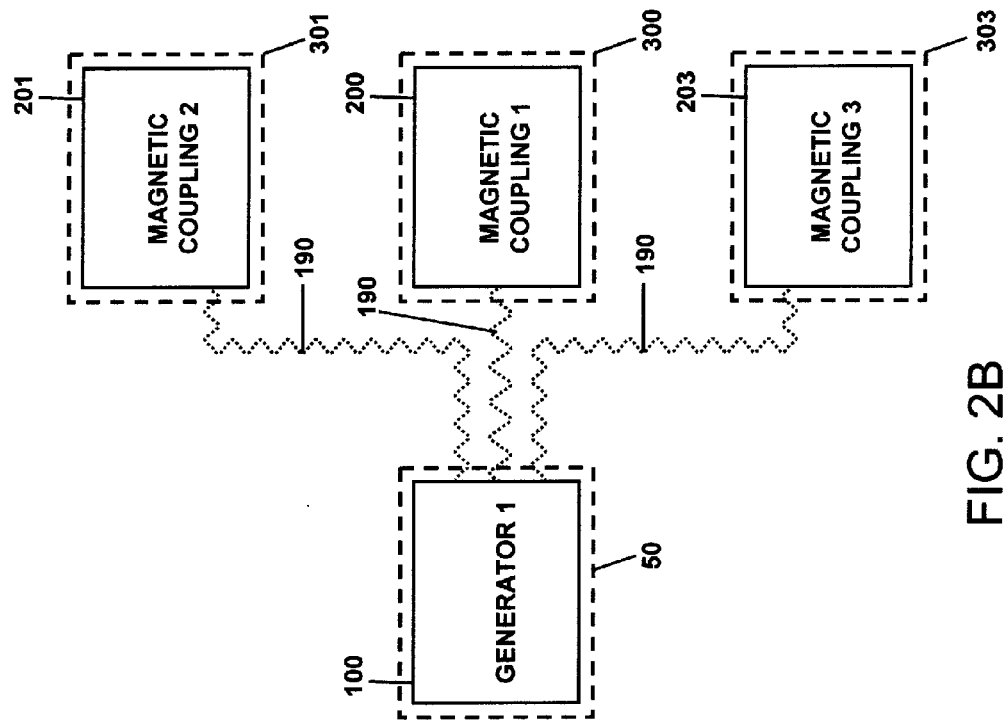
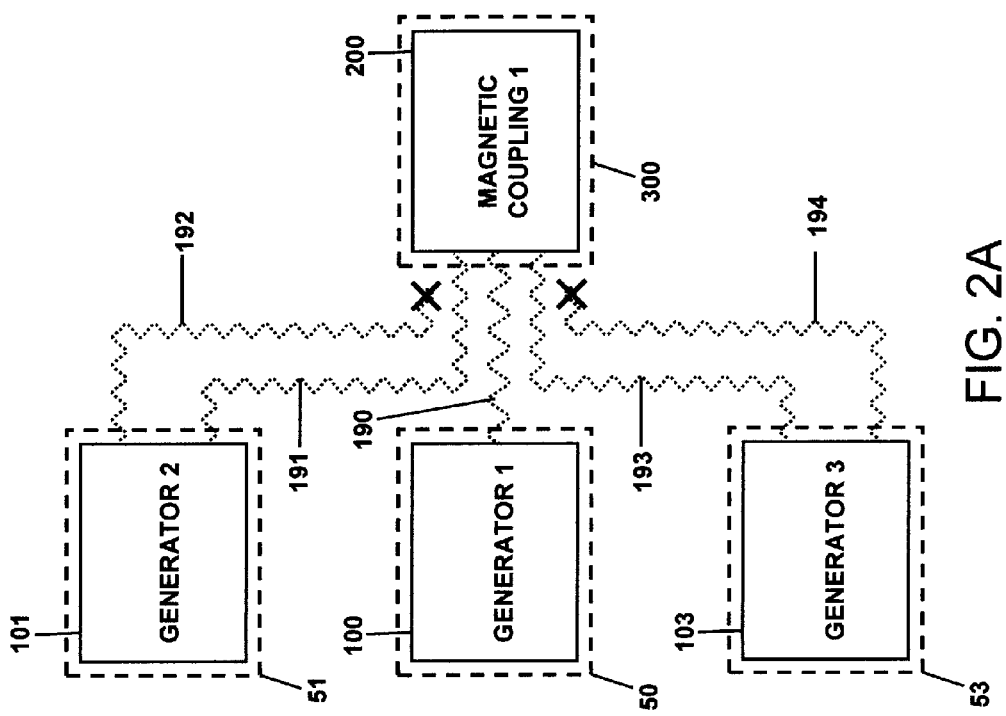
FIG. 2B
FIG. 2A

AUXILIARY SAFETY LIGHT SYSTEM

CROSS-REFERENCE TO RELATED PATENT APPLICATIONS

This application claims the benefit of the filing date of U.S. provisional patent application Ser. No. 60/514,849 filed Oct. 27, 2003, the disclosure of which is incorporated in its entirety by reference.

This invention relates in one embodiment to a lighting system used to enhance safety in the operation of a motor vehicle, and more particularly to a remotely controlled light affixed to the helmet of a motorcyclist.

FIELD OF THE INVENTION

A remotely controlled safety lighting system integrated with a motorcycle and the helmet of a motorcyclist, or with a car, van, truck, trailer, bicycle or other vehicle to enhance the safety of the operation of the motorcycle or vehicle.

BACKGROUND OF THE INVENTION

A recent (1998) study by the National Highway Traffic Safety Administration (NHTSA) measuring the long-term effectiveness of center high mounted stop lamps in passenger cars and light trucks found that these lights each year prevent thousands of motor vehicle crashes and injuries and more than a half billion dollars in property damage costs. "Safety is President Clinton's highest transportation priority, and the center high-mounted stop lamp is an excellent example of a device that provides significant safety benefits at a fraction of its cost to consumers," said Ricardo Martinez, M.D., NHTSA administrator.

The study concluded that the center brake lights prevent 92,000 to 137,000 police-reported crashes, 58,000 to 70,000 nonfatal injuries, and $655 million in property damage a year. It also estimated that the lamps save $3.18 in property damage alone for every dollar that they cost.

The safety risks associated with riding a motorcycle are higher than those driving an automobile. There are several reasons for this. First, motorcycles are smaller than automobiles, and other motorists often have a hard time seeing motorcycles on the roads. Further, motorcycles are generally capable of higher rates of acceleration than automobiles causing other motorists to often lose track of the position of a nearby motorcycle. Also, motorcycles are generally capable of higher rates of de-acceleration than automobiles, causing motorcycles to often be hit from behind by motorists that are unable to stop in time. Finally, motorcycles lack the weight, protective structure and other safety devices (such as airbags) that are offered in automobiles. These findings are supported by the Hurt report conducted in 1981 through The National Highway Traffic Safety Administration and the University of Southern California (USC).

The Hurt Report showed that approximately 75% of all motorcycle accidents involve a collision with another vehicle, and rear-end collisions are a significant risk. Among their findings it was shown that "The failure of motorists to detect and recognize motorcycles in traffic is the predominating cause of motorcycle accidents. The driver of the other vehicle involved in collision with the motorcycle did not see the motorcycle before the collision, or did not see the motorcycle until too late to avoid the collision". It was also noted that "Conspicuity of the motorcycle is a critical factor in the multiple vehicle accidents, and accident involvement is significantly reduced by the use of motorcycle headlamps (on in daylight) and the wearing of high visibility yellow, orange or bright red jackets." In addition, United States government research on automotive tail light positioning has found that significantly fewer accidents occur in vehicles having a brake light positioned at or near the highest point on the rear of the vehicle. In 1986, the U.S. government mandated that automobiles sold in the United States be equipped with a third brake light positioned near the highest point on the rear of the vehicle. All new light trucks were required to meet the same standards in 1994. To date, there is no requirement for motorcycles, trailers and certain commercial vehicles to have a similar light.

A typical tail light assembly for a motorcycle includes a running light, a brake light, turn indicators and hazard indicators. For most motorcycles, the running light is always lit when the ignition circuit is energized. In a few motorcycles, the running light is only energized when the headlight is manually turned on by the rider. Typically the taillight is mounted at the rear of the motorcycle above the rear fender. Depending on the size and style of the motorcycle, the taillight is often small, relatively low to the ground and hard to see by other motorists.

Several additional safety concerns must be considered when contemplating the installation of a lighting system on a helmet. First, a wireless link between the helmet and the motorcycle is preferred over a wired system to prevent a variety of possible wire related injuries that could cause or occur during an accident. Second, safe voltages and lamp temperatures should be used to avoid exposing the rider to these hazards in the event that an accident exposes the rider to a live circuit or lamp.

In a wireless system, a power source such as a battery must generally be attached to the helmet. For the helmet assembly, a small battery is beneficial for several reasons. Namely it is smaller and more comfortable to wear than a large battery. To effectively use the power of a smaller battery, the power draw of the magnetic-coupling should be minimized to lengthen battery life and reduce the need for battery recharge or replacement. At the same time, for a helmet lighting system to be effective, a high minimum lamp illumination intensity must be provided to allow nearby motorists to see the lamp signal, even in bright sunlight. Consequently, there is a need to produce a high intensity helmet lighting system that is energy efficient. Prior art helmet lighting systems have generally used lamps that are of lower than desirable intensity, since such systems are not able to provide enough power to operate higher intensity lamps for sustained periods with available on-board power sources.

In a battery operated system where the light is not in the operator's field of vision, it is not always possible to tell if the light is working. It is the intent of one embodiment of the system of the instant invention to provide a means of signaling to the user that the system is functioning correctly and has adequate battery strength by generating an audible tone when the light unit receives a coded signal from the transmitter when it is activated after a period of inactivity. In addition, if the battery strength drops below a specified level, a single LED will flash rapidly or stay illuminated until the batteries are changed.

Since one embodiment of the unit may be utilized in harsh conditions, it has been designed with simplicity and ruggedness in mind. There are no moving parts, the system is designed to handle shock and vibration and resistance to moisture. The case has been designed to seal with an O-ring seal and has no case penetration or need for any switches or wires. Additionally, this embodiment of the device features a sensory circuit that will automatically turn the unit on (i.e. "awaken" the unit from a low-energy consumption "sleep" mode) when it is used, preventing human error such as failure to turn the unit on.

The H-field backscatter signal generator used in one embodiment of the invention is a superior design over other wireless links such as infrared (IR) or radio frequency (RF) that are more susceptible to interference and disruption.

To increase the visibility in other applications such as bicycle, off road use and racing, a user selectable option will allow for an initial rapid flash to alert others to a braking condition.

Heretofore, a number of patents and publications have disclosed remotely controlled vehicular safety lights, the relevant portions of which may be briefly summarized as follows:

U.S. Pat. No. 6,406,168, "Helmet Mounted brake light," of Whiting discloses a lighting system that uses radio frequency communication. The system of Whiting is relatively high in power consumption, is prone to interference, and has no provision for a single helmet to communicate with several transmitters.

U.S. Pat. No. 5,477,209, "Remote controlled safety light having increased noise discrimination," of Benson et al. discloses a simple radio frequency controlled "on" mechanism that turns on a helmet light for a predetermined amount of time once a brake signal is received. There is no intelligence provided in that the brake light therein stays on only as long as such "predetermined amount of time" allows.

U.S. Pat. No. 5,040,099, "Motorcycle safety helmet," of Harris discloses a lighting system using a beam of light or a sonic beam to operate a remote brake light including light transmission to include an optic fiber. These methods of activation are inherently prone to interference from stray light sources, such as infrared light emanating from heated surfaces, which are common in heavy vehicle traffic.

U.S. Pat. No. 5,704,707, "Motorcycle safety helmet system," of Gebelein et al. discloses an Infrared transmitter/receiver that requires a line of sight between the transmitter and receiver thereof. Such device is also prone to interference from the sun and other light sources In spite of the provision of these and other lighting devices and systems, an optimum solution to the problem of providing a lighting system that is remotely operated, easily programmed, low in power consumption, highly visible, not susceptible to interference from other communication devices, and is durable in the environment; and provides on-board diagnostics and automated failsafe functionality with visual and audible cues has not been heretofore provided. Prior art devices also use communication means that have relatively high power consumption; hence such devices must use lower power/lower brightness lighting as a tradeoff of sacrifice due to their communication power demands.

In view of the above shortcomings in the prior art devices, embodiments of the present invention are provided that meet at least one or more of the following objects of the present invention.

It is one object of the present invention to provide an energy efficient remote auxiliary vehicle safety lighting device.

It is another object of the present invention to provide a wireless system capable of displaying brake lights, running lights, turn indicators, hazard lights, and emergency lights.

It is yet another object of the present invention to provide a lighting system having an H-field backscatter generator capable of broadcasting a unique code set, thereby preventing interference between vehicles when two or more system equipped vehicles are in close proximity.

It is yet another object of the present invention to provide a lighting system having an H-field backscatter generator capable of broadcasting more than one code set, thereby allowing several magnetic-couplings to be used independently with one H-field backscatter generator.

It is a further object of the present invention to provide a lighting system that is safe, easy to use and comparatively cost effective.

It is a further object of the present invention to provide a lighting system that does not sacrifice the brightness of the lighting thereof because of high power consumption by communication circuitry.

It is yet another object of the present invention to provide a lighting system that is flexible in use, enabling combinations of multiple transmitters and multiple receivers to communicate, and enabling the system to be deployed on a variety of vehicles and objects to be illuminated.

SUMMARY OF THE INVENTION

In accordance with one embodiment of this invention, there is provided a safety lighting system comprising an H-field backscatter generator adapted to receive at least one electrical signal indicating the application of electrical power to at least one light circuit and comprising means for encoding and transmitting at least one encoded signal; a magnetic coupling receiver located separately from said H-field backscatter generator and adapted to receive said first encoded signal; and a light display electrically connected to said magnetic coupling receiver, said light display comprising at least one illuminatable lamp.

In accordance with one embodiment of this invention, there is further provided a safety lighting system for enhanced safety of a rider of a motorcycle, said system comprising an H-field backscatter generator disposed upon a motorcycle and adapted to receive at least one electrical signal indicating the application of electrical power to at least one light circuit of said motorcycle and comprising means for encoding and transmitting at least one encoded signal; a magnetic coupling receiver disposed on a safety helmet worn by said rider and adapted to receive said first encoded signal; and a light display electrically connected to said magnetic coupling receiver, said light display disposed upon the outside surface of said helmet and comprising at least one illuminatable lamp.

The lighting system described above is advantageous because it has very low power consumption, requires minimal space for components, is easily adapted to multiple motorcycles or other vehicles, and to multiple helmets or other placement locations for safety lighting, and can be provided at very low cost

BRIEF DESCRIPTION OF THE DRAWINGS

The invention will be described by reference to the following drawings, in which like numerals refer to like elements, and in which:

FIG. 1B is a schematic diagram of the magnetic coupling that comprises a second part of the applicants' safety lighting system;

FIG. 1C is an elevation view of one embodiment of safety lighting affixed to a safety helmet or other device, taken along the line 1C—1C of FIG. 1B;

FIG. 2A is a schematic diagram of choices of communication relationships between multiple H-field backscatter generators and one magnetic coupling;

FIG. 2B is a schematic diagram of a choice of communication relationship between one H-field backscatter generators and multiple magnetic couplings;

DESCRIPTION OF THE PREFERRED EMBODIMENTS

Figure 1A:
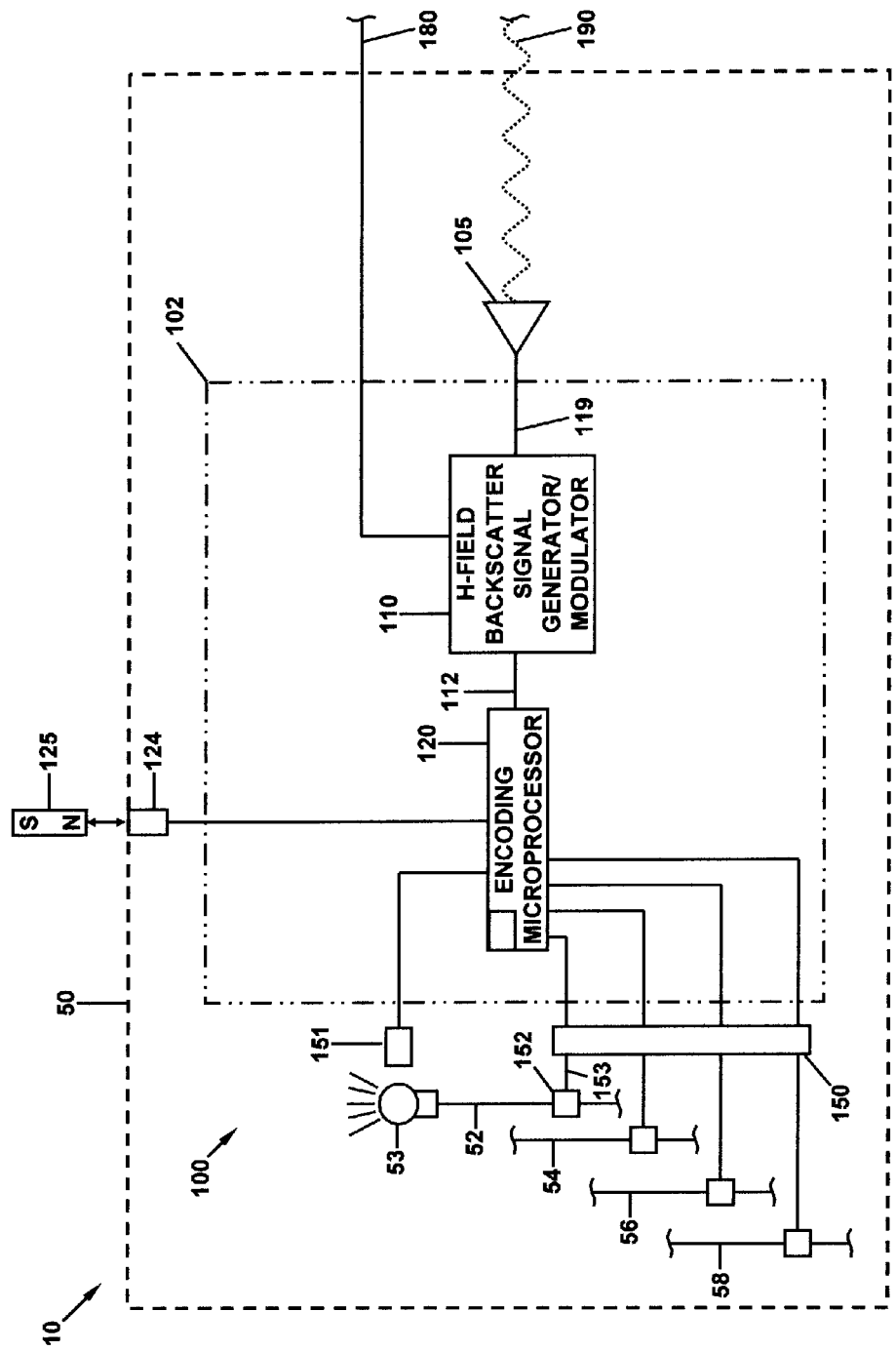
FIG. 1A is a schematic diagram of the H-field backscatter generator that comprises a first part of the applicants' safety lighting system.

For a general understanding of the present invention, reference is made to the drawings. In the drawings, like reference numerals have been used throughout to designate identical elements.

As used herein, the term "H-field backscatter generator" is meant to indicate a VLF (very low frequency) oscillator that produces low-frequency electromagnetic radiation in all directions.

Backscatter communication device and method technology has advanced considerably. For example, one may refer to U.S. Pat. No. 6,600,905 of Greef et al., "Communication system, interrogators and communication methods;" U.S. Pat. No. 6,466,771 of Wood, "Wireless communication system, radio frequency communications system, wireless communications method, radio frequency communications method, and backscatter radio frequency communications system;" and U.S. Pat. No. 6,459,726 of Ovard et al., "Backscatter interrogators, communication systems and backscatter communication methods," the disclosures of which are incorporated herein by reference.

The general features of the applicants' safety lighting system will now be described with reference in particular to FIGS. 1A–2B. FIG. 1A is a schematic diagram of the H-field backscatter generator that comprises a first part of the applicants' safety lighting system, and FIG. 1B is a schematic diagram of the magnetic coupling that comprises a second part of the applicants' safety lighting system. In the following description, an embodiment of the applicants' safety lighting system is described that is adapted to be used by the rider (or riders) of a motorcycle, with such rider wearing a safety helmet. It is to be understood that the applicants' safety lighting system may be adapted to any number of other situations where it is desired to actuate and control a remote safety light or lights by wireless communication, wherein such light or lights are made to mimic the operation of another light or lights that are operating onboard a nearby vehicle or other lighted object. Thus the following description of the applicants' safety lighting system adapted to operation of a motorcycle and use of a safety helmet is provided as one illustrative example, and is not to be construed as limiting with regard to the scope of the invention.

Referring to FIG. 1A, a first part of applicants' safety lighting system 10 is H-field backscatter generator system 100. In general, backscatter generator system 100 monitors the operation, and transmits signals 190 corresponding to such operation of one or more lights on a motorcycle 50, the general boundary of which is represented by a dotted line boundary. Referring to FIG. 1B, a second part of applicants' safety lighting system 10 is magnetic coupling system 200. In general, magnetic coupling system 200 receives signals 190 that are transmitted from H-field backscatter generator system 100, detects the presence or absence of an H-field backscatter of a specific frequency, and operates at least one and preferably a multiplicity of safety lamps 290 disposed on the exterior of safety helmet 300, the general boundary of which is represented by a dotted line boundary. In a preferred embodiment to be described herein in more detail, magnetic coupling system 200 operates lamps 290 in a manner that corresponds to the operation of the safety lighting on motorcycle 50, and thus provides a distinct indication of brake, left turn, right turn, and hazard condition to anyone following the motorcyclist and observing lamps 290 on the helmet 300 of the rider.

Referring again to FIG. 1A, the H-field backscatter generator system 100 of the applicants' safety lighting system 10, or remote auxiliary lighting system 10, will now be described in more detail. Certain components of H-field backscatter generator system 100 are preferably integrated and electrically connected on a single small circuit board 102, indicated by an intermittent dotted and dashed line border. Such circuit board 102 is preferably enclosed in a weatherproof enclosure (not shown), or disposed in a location on the motorcycle which is protected from adverse elements, such as under the motorcycle seat.

H-field backscatter generator system 100 comprises an H-field backscatter signal generator 110, which is a very low frequency oscillator for transmitting a very-low frequency magnetic field backscatter signal 190 to magnetic-coupling system 200 in electrical circuit board 202 contained within the motorcycle helmet 300. The presence of the field is indicative of a binary data state of 1, and the absence of the field is indicative of a binary data state of 0.

H-field backscatter generator system 100 further comprises an encoding microprocessor 120 that encodes a specific sequence of binary data in response to the detection of a voltage across an element of a lighting circuit on the motorcycle, and uses such data to modulate H-field backscatter signal generator 110. Encoding microprocessor 120 is mounted on the motorcycle 50 and connected to one or more of the lighting circuits 52, 54, 56, and 58 of such motorcycle 50. In particular, the brake light circuit 52, the running light circuit 54, the turn signal circuits 56 and 58 and the hazard flasher circuit (not shown) can be monitored by the encoding microprocessor 120 of the H-field backscatter generator system 120. When such encoding microprocessor 120 receives or detects a voltage present in one of the motorcycle lighting circuits 52 et seq. indicating that such lighting circuit is energized, the encoding microprocessor 120 produces and sends a sequential burst of data through electrical conductors 112 to the H-field backscatter signal generator 110. The H-field backscatter signal generator 110 receives the coded burst from the encoding microprocessor 120 and modulates it as signal(s) 190 to the magnetic-coupling system 200 via the a magnetic field.

Referring now to FIG. 1B, the magnetic-coupling system 200 of the applicants' safety lighting system 10, will now be described in more detail. Certain components of magnetic-coupling system 200 are preferably integrated and electrically connected on a single small circuit board 202, indicated by an intermittent dotted and dashed line border.

In the preferred embodiment, magnetic coupling system 200 is provided on a miniaturized circuit board 202 that is contained within helmet 300. Magnetic coupling system 200 comprises a demodulator 210 which receives signal 190 from H-field backscatter generator 100. Demodulator 210 is preferably an H-field backscatter detector comprising a ferrite bar wound with litzengraf wire forming a resonant antenna and a direct conversion or homodyne type demodulating integrated circuit with selective crystal filters.

Demodulator 210 is connected by electrical conductors 212 to decoding microprocessor 220, which, in response to such signals 190, energizes one or more lamps 290 that are preferably disposed on the rearward exterior of helmet 300. Decoding microprocessor 220 decodes a binary data sequence encoded in signal 190 from H-field backscatter generator 100, and upon verifying a pre-determined matching sequence of data, activates lamps 290. Decoding microprocessor 220 energizes and detects data from the H-field backscatter generator 100 in a relatively short time period, e.g., preferably less than about 5 milliseconds. This capability allows for an extremely low duty cycle of operation, and consequently, ultra-low power consumption.

Optionally, there is also provided an audible tone 232 from miniature speaker 230 (or other audio device such as a piezoelectric beeper) when one or more of the lamps 290 are energized. Magnetic-coupling system 200 further comprises a ferrite or tricoil antenna 205 for receiving signal 190. Antenna 205 preferably comprises a ferrite bar wound with litzengraf wire forming a resonant antenna. Antenna 205 receives the magnetic signal 190 containing a predetermined code, and conveys such signal 190 to demodulator 210 through conductors 206. Subsequently, the demodulator 210 extracts the predetermined code from the magnetic signal 190 and sends the code to the decoding microprocessor 220.

FIG. 2A is a schematic diagram of choices of communication relationships between multiple H-field backscatter generators and one magnetic coupling. In one aspect of the applicants' safety lighting system, it is ensured the magnetic signal that is received by the magnetic coupling onboard the helmet originated from the desired vehicle H-field backscatter generator, e.g., in the case of the motorcycle rider, the H-field backscatter generator on board the rider's motorcycle.

Referring to FIGS. 1A, 1B, and 2A, to ensure that the magnetic signal 190 received by magnetic coupling 200 onboard helmet 300 originated from the desired vehicle H-field backscatter generator 100, the decoding microprocessor 220 of the magnetic coupling 200 compares the received codes from any particular generators 100, 101, and 103 of motorcycles 50, 51, and 53 nearby (i.e. within transmission/receiving range) to a stored code. In the case of signal generators 101 and 103 on motorcycles 51 and 53, such codes would not match the stored code of magnetic coupling 200, and such codes would be disregarded, since they represent the actions of motorcycles 51 and 53. Accordingly, signal 192 from signal generator 101/motorcycle 51 and signal 194 from signal generator 103/motorcycle 53 are disregarded as indicated by the respective X's marking such signals.

In general, backscatter generator 100 transmits an encoded identification signal anytime that electrical power is applied thereto, even if no lighting activity is detected on motorcycle 50. In the instance where the received identification code matches the stored code, i.e. for signal 190 from signal generator 100, the received code is recognized and signal 190 encoded with the data for the operation of the lighting of motorcycle 50 is processed by the decoding microprocessor 220. This capability enables the applicant's safety lighting system to operate the safety lighting on the rider's helmet only in concert with the lighting on the rider's motorcycle, and to ignore any signals/interference from other nearby motorcycles.

Referring again to FIG. 2A, and in yet a further embodiment of the applicant's safety lighting system, magnetic coupling 200 in helmet 300 can be programmed to accept a plurality of codes, and thus to accept signals from a plurality of signal generators. The embodiment depicted in FIG. 2A corresponds to the situation wherein a motorcycle rider owns three motorcycles 50, 51, and 53, and thus he has programmed the magnetic coupling 200 in his helmet 300 to accept the codes from signal generators 100, 101, and 103, and to receive and respond to the transmitted signals 190, 191, and 193 therefrom. As the rider can only operate one motorcycle at a time, there is no risk of interference from the other two motorcycles.

Referring again to FIG. 1B, when the code contained in an incoming signal 190 is recognized, the decoding microprocessor 220 creates a predetermined electrical blinking sequence in a pulse circuit 222. In one embodiment, a group of lamps 290 is comprised of a plurality of light-emitting diodes 291 (LED's), which are connected to the pulsed circuit 222 as well as the tone generator 230. The predetermined blinking sequence flows from the pulsed circuit 222 through electrical conductors 223 and illuminates the lamps/LED's 291 to simulate a specific lighting function such as a brake light.

FIG. 1C is an elevation view of a further embodiment of safety lighting affixed to a safety helmet or other device, taken along the line 1C—1C of FIG. 1B, wherein such safety lighting comprises a two-dimensional array 292 of LED's 291 or other suitable miniature high intensity lamps. In one preferred embodiment of the applicants' lighting system, the microprocessor 220 and pulse circuit 222 generate a variety of blinking sequences that vary in pulse rate, and/or pulse length, and that may contain de-energized periods of varying lengths of time to thereby simulate the various lighting functions occurring onboard the motorcycle, including brake lights, running lights, turn indicators and hazard lights.

As such, each blinking sequence has a duty cycle associated with it that is indicative of the power required to produce the lighting function. By varying the features of the illumination, certain intensities and flashing patterns can be created. For example, to simulate a brake light, the predetermined blinking sequence generated by the microprocessor may consist of pulse periods having relatively high pulse rates and relatively long pulse lengths, with short de-energized periods interposed between the pulse periods. The result is a high intensity light with a visibly noticeable flash that requires less power than a continuous high intensity light. Conversely, to create the low intensity light needed to simulate a running light, the predetermined blinking sequence generated may consist of pulse periods having relatively low pulse rates and relatively short pulse lengths, with or without de-energized periods interposed between the pulse periods.

By way of further illustration, when a "brake" signal is received from H-field backscatter generator 100, light array 292 may optionally flash rapidly for 3 seconds and then be illuminated constantly until such brake signal has ended. This initial "rapid flash" feature may be provided as a programmable feature via an additional switch (not shown) allowing this feature to be toggled on and off. This feature is considered to be an advantage in increasing the visibility of the motorcyclist during braking; however, it is desireable to provide the capability to toggle the feature off, since in some states in the United States, such rapid flashing lighting on a vehicle is prohibited by law.

In a further embodiment, the lights 291 of group 290 or array 292 are separated into three groups 296, 292, and 297 (see FIG. 6 and FIG. 7) to provide left and right turn indication and a center running/brake light.

For a simple system using only a single light, a system using a group or groups of lights 290, or an array 292 of lights, all such systems are provided with individual lamps/LED's of sufficient intensity so as to render such lamps/LED's visible in daylight at up to about 300 feet away and up to about a 45 degree angle of observation.

In one embodiment, magnetic coupling 200 is further provided with a plurality of small light emitting diodes (LED's) or other visual indicators mounted on circuit board 202. Each LED is connected to one of conductors 223 that supply electrical power to the LED's of lamps 290/lighting array 292. For the sake of simplicity of illustration, only one LED 227 is depicted in FIG. 1B connected to conductor 229 in parallel with LED 291, with it being understood that LED's are connected to each of conductors 223 to lamps 290/lighting array 292. In this manner, the magnetic coupling can be operated without being connected to lamps 290/lighting array 292, while still providing an indication of its operation in the event that troubleshooting or testing must be performed.

Referring again to FIG. 1B, and in the preferred embodiment, magnetic coupling system 200 further comprises a power source such as a battery 242 to supply power to demodulator 210, pulse circuit 222, and decoding microprocessor 220. To conserve energy during non-use, an ultra-low duty cycle is employed by decoding microprocessor 220. The decoding microprocessor 220 prevents power from being disconnected from any source if a predetermined code is received from the H-field backscatter generator during a pre-designated time interval, such code indicating that the signal generator 110/motorcycle 50 are still active and in operation.

As was described previously, it is highly preferable that each H-field backscatter generator broadcast a set of codes that are unique to the H-field backscatter generator to prevent interference between vehicles when two or more system-equipped vehicles are in close proximity. Furthermore, it is also preferable and a capability of the applicants' safety lighting system that a single H-field backscatter generator have the capability to broadcast more than one code set to allow several helmet magnetic coupling systems to be used independently with one H-field backscatter generator. In general, the H-field backscatter generator 100 of the applicants' lighting system transmits a signal 190 that is receivable by the magnetic coupling 200 at a distance of not less than 5 feet and up to a maximum distance of about 100 feet.

This capability enables convenient and safe use of the applicants' lighting system in certain common scenarios to be described presently with reference to FIG. 2B. FIG. 2B is a schematic diagram of a choice of communication relationships between one H-field backscatter generators and multiple magnetic couplings. In a first scenario, a first magnetic coupling 200 is provided in a helmet 300 worn by the driver of motorcycle 50 comprising signal generator 100; and a second magnetic coupling 201 is provided in a helmet 301 worn by the passenger of motorcycle 50. Magnetic couplings 200 and 201 are both programmed to receive and recognize signal 190 from signal generator 190 on board motorcycle 50. Accordingly, the lamps 290 (see FIG. 1B) provided on the riders' helmets will both be illuminated in concert with the operation of lighting on the motorcycle 50. The lighting on the passenger's helmet 301 in particular will be visible to other motorists following the motorcycle.

Since the lighting on the motorcycle driver's helmet 300 may be directed toward the eyes of the passenger, the system is further provided with switching means to manually and temporarily disable the lighting on a helmet, in this case the driver's helmet 300. Referring again to FIG. 1B, magnetic coupling system 200 is provided with a switch 224 that the helmet user can actuate manually to signal to microprocessor 220 to temporarily disable lighting 290. Microprocessor 220 is programmed to resume the operation of lighting 290 after a predetermined length of time, so that such lighting 290 is automatically re-established in the event that the driver discharges his passenger and forgets to toggle switch 224 to turn on lighting 290.

Switch 224 may be a simple push-button switch disposed on or through the wall of helmet 300. In a preferred embodiment, switch 224 is a magnetic reed switch disposed in helmet 300 beneath the surface of such helmet. Such a magnetic switch 224 is operated by moving a small magnetic key fob 225 or dongle 225 in close proximity to switch 224. Such small magnetic key fobs are well known; for example, such fobs are used in actuating the operation of gasoline pumps such as those operated by the Mobil Speedpass® system.

Referring again to FIG. 2B, and in a second scenario, a first magnetic coupling 200 is provided in a first helmet 300 worn by a first driver of motorcycle 50 comprising signal generator 100; a second magnetic coupling 201 is provided in a second helmet 301 worn by a second driver of motorcycle 50, and a third magnetic coupling 203 is provided in a third helmet 301 worn by a third driver of motorcycle 50. Each of the drivers has his/her individual helmets 300, 301, and 303 that he/she wears when operating motorcycle 50. Such a circumstance may occur when the use of one motorcycle is shared between several drivers.

Accordingly, magnetic couplings 200, 201, and 1202 in helmets 300, 301, and 303 are all programmed to receive and recognize signal 190 from signal generator 190 on board motorcycle 50. In the operation of motorcycle 50, the lamps 290 (see FIG. 1B) provided on each of the riders' helmets 300, 301, and 303 will be illuminated in concert with the operation of lighting on the motorcycle 50.

In the case where there is only one generator transmitter 100 on board a motorcycle and one magnetic coupling receiver 200 in a helmet, generator transmitter 100 automatically links with magnetic coupling receiver 200. However, in order to accommodate these various scenarios involving more than one generator transmitter 100 and/or more than one magnetic coupling receiver 200, the applicants' lighting system is provided with programmable capability. In particular, lighting system 10 provides a teach-and-learn protocol for establishing a wireless communication link between an H-field backscatter generator and a magnetic-coupling.

Referring again to FIGS. 1A and 1B, H-field backscatter generator 100 can be toggled between a teach mode and an operational mode by the manual manipulation of a mode switch 124 connected to the encoding microprocessor 120 of H-field backscatter generator 100. To accommodate several magnetic-couplings as just previously described, each H-field backscatter generator 100 can include primary and secondary teach modes and primary and secondary operational modes. Similarly, each magnetic-coupling 200 can be toggled between a learn mode and an operational mode by the manual manipulation of a mode switch connected to the magnetic-coupling microprocessor. Such mode switch may be switch 224, which comprises multiple sets of contacts or has other selectable operation such as a keypad, or such mode switch may be a separate dedicated switch similar to switch 224.

In one embodiment of the present invention, a cord 180 extending from the H-field backscatter generator 100 is used to toggle the magnetic-coupling 200 into learn mode. When the cord 180 is engaged in a socket 226 on the magnetic-coupling 200, the magnetic-coupling 200 toggles into learn mode and sends a signal through the cord 180 to the H-field backscatter generator 100 verifying that learn mode has been set.

In this embodiment, upon placing the H-field backscatter generator 100 in a teach mode, the encoding microprocessor 120 of the H-field backscatter generator 100 preferably first establishes a unique code set for the magnetic-coupling 200. The established code set comprises a predetermined code for each of the vehicle lighting circuits, such as the brake circuit 52, running light circuit 54, turn signal circuits 56 and 58, and the hazard flasher circuit (not shown), that are to be simulated by the helmet lamps 290. In one embodiment of the present invention, the H-field backscatter generator microprocessor 120 randomly selects the codes for the code set from a group of at least 2500 potential codes, thus creating a unique code set. In another embodiment, unique codes for each code set are factory selected, and remain fixed for the life of each H-field backscatter generator 100. In either case, a sufficient number of codes are used so as to minimize the chance of two nearby units sharing the same code and interfering with each other.

Once the code set is established, and while the H-field backscatter generator 100 is still in teach mode, the H-field backscatter signal generator/modulator 100 modulates the code set onto a magnetic signal and broadcasts the signal 190 through the ferrite or tricoil antenna 105 of the H-field backscatter generator. Antenna 105 preferably comprises a ferrite bar wound with litzengraf wire forming a resonant antenna.

When the code set is received by magnetic-coupling 200 that is set in learn mode, the magnetic-coupling 200 stores the code set in memory 228, overwriting any previously stored codes. When the code set is received by a magnetic-coupling 200 that is set in operational mode, the magnetic-coupling 200 will not overwrite the stored codes in response to a transmitted code set. Once the code set has been stored by the magnetic-coupling 200, the magnetic-coupling 200 can be placed in operational mode by manual manipulation of the mode switch 224. The magnetic-coupling 200 can be placed in operational mode by removing the cord 180, or, if a cord 180 is not used, by toggling mode switch 224.

As indicated above, an H-field backscatter generator may be placed in a secondary teach mode for teaching a second code set to a second remote auxiliary light, such as a passenger's helmet 301 (see FIG. 2B). In one embodiment, once both magnetic-couplings 200 and 201 have stored a unique code set, one or both of such units 200 and/or 201 can be selected for operational use by setting the mode switch 124 on the H-field backscatter generator 100 to the desired operational mode for the selected helmet 300 or 301 (primary operational mode or secondary operational mode).

Since each magnetic-coupling 200 and 201 are capable of being re-coded, each magnetic-coupling 200 and 201 can be used as either a primary magnetic-coupling or a secondary magnetic-coupling. Preferably, each H-field backscatter generator 100 has an encoding microprocessor 120 configurable between four different modes; a primary teach mode, a secondary teach mode, a primary operational mode and a secondary operational mode. Preferably, the encoding microprocessor 120 can be configured into one of these modes by the manual manipulation of the mode switch 124. Similarly, each magnetic-coupling 200 preferably has a decoding microprocessor 220 that can be reconfigured between two modes; a learn mode and an operational mode. The decoding microprocessor 220 can be configured into one of these two modes by the manual manipulation of the mode switch 224 or by insertion/removal of cord 180 from the H-field backscatter generator 100 into socket 226 on the magnetic-coupling 200, as described above.

In one embodiment, when H-field backscatter generator 100 is placed into primary teach mode, the encoding microprocessor 120 first establishes a unique code set for a primary magnetic-coupling 200. The code set consists of a predetermined code for each of the motorcycle lighting circuits 52–58, as well as a predetermined code for a stay-alive code, if required. In one embodiment of the present invention, the encoding microprocessor 120 cycles through a pre-designated list of 32 codes. In another embodiment, unique codes for each code set are pre-set at the factory, and remain fixed for the life of each H-field backscatter generator 100. Once the code set is established, and while the H-field backscatter generator 100 is still in primary teach mode, the H-field backscatter signal generator 110 modulates the code set onto a magnetic signal and broadcasts the signal 190 through the antenna 105 to any nearby magnetic-coupling 200.

In one embodiment, when the primary magnetic-coupling 200 is placed into learn mode before the code set from the H-field backscatter generator 100 is received, the primary magnetic coupling 200 will preferably store the code set in memory 228, overwriting any previously stored code sets. Conversely, if the transmitted code set is received by a magnetic-coupling 200 that is set in operational mode, the magnetic-coupling 200 will not overwrite the stored codes and, because none of the received codes match the stored codes, the pulse circuit 222 of the magnetic-coupling will not be activated.

Referring to FIG. 2B, once the code set has been stored by the primary magnetic coupling 200, another wireless link can preferably be established with one or more secondary magnetic couplings 201 and 203 (if required), by repeating the sequence of steps outlined above with the H-field backscatter generator 100 placed in secondary teach mode. Once one or more of additional magnetic couplings 201 and/or 203 have stored a unique code set and been placed in operational mode, one of such magnetic couplings can be selected for operational mode, preferably by setting the mode switch 124 on the H-field backscatter generator 100 to the desired operational mode for that particular magnetic-coupling. To select the primary magnetic coupling 200, which may be attached to the driver's helmet 300, the H-field backscatter generator 100 can be set to primary operational mode. Similarly, to select the secondary magnetic coupling 201 or 203, which may be attached e.g., to a passenger's helmet 301 or 303, the H-field backscatter generator 100 can be set to secondary operational mode.

Referring again to FIG. 1A, and in one embodiment depicted therein, during the operation of the motorcycle 50, when the rider depresses the brake pedal, for example, and actuates brake circuit 52, a voltage is provided across a detector 152 connected to the brake circuit 52 of the motorcycle 50, and/or the brake light 53 of the motorcycle 50. In response, the H-field backscatter generator microprocessor 120 receives a voltage signal indicating the presence of this voltage in the brake circuit 52 and generates and sends a signal 190 containing a predetermined code to the magnetic-coupling 220. Upon receiving the signal 190 containing the predetermined code, the decoding microprocessor 220 of magnetic-coupling 200 illuminates a lamp or group of lamps 290 on the helmet 300 to simulate a brake light, and also optionally generates an audible tone 232 through speaker 230.

In accordance with one aspect of the present invention, the H-field backscatter generator 100 can transmit a predetermined code in response to a voltage detection in any other lighting circuit of the vehicle such as the running light circuit 54, turn indicator circuits 56 and 58, or the hazard circuit (not shown). As described in detail below, all of the lighting circuits 52–58 for the vehicle can be monitored by the H-field backscatter generator detection circuitry 150, allowing for the transmission of a predetermined code representing each lighting circuit to the magnetic-coupling 200. Also described in detail below, the magnetic-coupling 200 contains a plurality of lamps 290 for simulating the various tail light functions of the vehicle. The magnetic-coupling 200 is capable of receiving all of the predetermined codes generated by the H-field backscatter generator 100 and responding to each predetermined code by selectively energizing one or more of the lamps 290 to simulate the specific tail light function represented by the predetermined code.

For example, the magnetic-coupling 200 can receive a code from the H-field backscatter generator 100 indicating that the left turn signal circuit 56 of the motorcycle is energized and respond to that code by causing a combination of the lamps 290 to illuminate in such a way that they indicate a direction, as indicated by arrow 299 of FIG. 1C. In another embodiment, a left or right turn signal is generated by sequencing a V pattern in the array 292 of LEDs 291 in the direction of the turn. If a brake signal is received during a turn sequence, the brake signal preferably supercedes the turn signal until the brake signal has ended.

In one embodiment depicted in FIG. 1A, the signal generator 110 of H-field backscatter generator 100 further includes a modulator. Preferably, in this embodiment, the voltage detection circuit 150 is grounded to the vehicle. In the preferred embodiment, the voltage detection circuit 150 is electrically connected to several circuits 52–58 of the motorcycle 50 for the purpose of receiving the motorcycle inputs. In a preferred embodiment, one or more wires 153 can be used to connect an electrical lead or leads (i.e. electrical connectors such as wiring) from the voltage detection circuit 150 to the brake light circuit 52 of the vehicle, allowing the voltage detection circuit 150 to receive a voltage whenever current flows and/or voltage is present in the brake light circuit 52. Preferably, the connection with the brake light circuit 52 is made so the voltage detection circuit 150 will still register a voltage even if the brake lamp 53 in the circuit 52 is unable to pass current. For example, a voltage can be induced across an inductor 152 near the brake lamp 53 to ensure that the microprocessor 120 receives a voltage when the brake lever is engaged, regardless of whether the brake lamp 53 is able to pass current, as would be the case for example, when the lamp has a broken filament and does not illuminate.

In one preferred embodiment, when the microprocessor receives a voltage from one of the lighting circuits of the motorcycle indicating that the lighting circuit is energized, the microprocessor generates a predetermined code and modulates the H-field backscatter generator directly. Alternatively or additionally, a photoelectric sensor 151 detects when such lighting circuit is energized and signals the microprocessor to generate a predetermined code and modulate the H-field backscatter generator directly.

Once the microprocessor 120 generates the predetermined code, it modulates the H-field backscatter signal generator 110, or the signal generator 110 is provided with modulation capability. In either case, the H-field backscatter signal generator 110 receives the predetermined code from the microprocessor 120. Preferably, the carrier signal 190 is a magnetic signal. The generator/modulator 110 modulates the predetermined code onto the carrier signal and sends the carrier signal 190 containing the predetermined code to the antenna 105 through electrical conductor 119. The antenna 105 broadcasts the signal 190 containing the predetermined code to the magnetic-coupling 200.

Preferably, the H-field backscatter signal generator 110 sends a continuous magnetic signal whenever the ignition system of the motorcycle 50 is energized. Furthermore, in one preferred embodiment, a predetermined code is sent as often as the maximum data transmission "baud" rate the given magnetic embodiment will permit. For example, if the brake light circuit 52 of the vehicle is energized for 10 seconds, a brake code will be produced by the microprocessor 120 for transmission every 0.2 seconds during the 10 seconds that the brake light circuit 52 is energized. If none of the lighting circuits 52–58 of the motorcycle 50 are energized, the duty cycle of the encoding microprocessor 120 will remain enhanced for a pre-designated time interval and continue to monitor for additional transmissions to be made from the H-field backscatter generator 120.

Referring again to FIG. 1B, and in one embodiment, magnetic-coupling system 200 further comprises a power supply 240 comprising a power switch 241, and/or a solar cell 243 and/or a battery charger 244. Optional solar cell 243 may be used to power magnetic coupling 200 or to recharge onboard battery 242. In the lighting system 10 of the present invention that is disposed within a motorcycle helmet 300, such solar cell 243 may be disposed on the upper outer surface of the safety helmet, and secured thereto with suitable means such as e.g., adhesive.

Alternatively or additionally, an optional battery charger transformer 244 can be provided on-board to recharge the power supply 240. An optional cord 245 may be provided to plug into jack or socket 247 to connect the battery charger transformer 244 into a household outlet, and/or the cord can be connected from the H-field backscatter generator 100 to allow the power supply 240 to be charged from the vehicle battery (not shown). Alternatively or additionally, a passive body motion charger (not shown) can be provided to recharge the power supply. In another embodiment(not shown), a vibratory charging coupling is provided, which converts the energy of vibration into electrical energy and charges the battery 244.

Battery or batteries 244 may be any suitable batteries having sufficient voltage to power magnetic coupling system 200 and lamps 290/292, and having long life and/or rechargeable capacity. Batteries 244 may be 1.5 volt AA or AAA alkaline batteries, 6 volt CR-123 lithium photocell batteries, of 9 volt batteries (typically used in e.g., some alarms).

Referring again to FIGS. 1A and 1B, as has been explained previously, the decoding microprocessor 220 and pulse circuit 222 can generate pulses in a variety of blinking sequences that vary in pulse rate, and/or pulse length, and that may contain de-energized periods of varying lengths to thereby simulate on the light row 290 or array 292 on helmet 300 the various lighting functions including, but not limited to brake lights, running lights, turn indicators and hazard lights. As such, and in one embodiment, each blinking sequence has a duty cycle associated with it that is indicative of the power required to produce the lighting function. Specifically, the duty cycle is the amount of time the pulsing circuit is energized divided by the amount of time the pulsing circuit is de-energized. By varying the features of the blinking sequence, the illumination intensity and flashing pattern of the lamps can be varied.

For example, to simulate a brake light, the predetermined blinking sequence generated by the microprocessor may consist of pulse periods having relatively high pulse rates and long pulse lengths, with short de-energized periods interposed between the pulse periods. The result is a high intensity light with a visibly noticeable flash that requires less power than a continuous high intensity light. Conversely, to create the low intensity light needed to simulate a running light, the predetermined blinking sequence generated may consist of pulse periods having relatively low pulse rates and short pulse lengths, with or without de-energized periods interposed between the pulse periods. For the present invention, the microprocessor 220 has the capability of providing different blinking sequences to the plurality of lamps 290/292 simultaneously, thereby allowing each lamp 291 to be pulsed independently.

When signaled, the microprocessor 220 preferably establishes a function specific electrical blinking sequence in a pulse circuit that contains one or more of the lamps 291. Preferably, the electrical blinking sequence is generated in the pulse circuit 222 for a predetermined amount of time. For example, if the timing circuit for the H-field backscatter generator 100 is set to send a predetermined code every 0.2 seconds, then the microprocessor 220 will generate a blinking sequence in the pulsing circuit 222 to create the desired effect with a latency period for filtering out any voids in reception. It will thereafter wait for another signal.

In one embodiment, a latency byte that is used to create a "stay alive" code is periodically sent by the H-field backscatter signal generator 110 whenever the ignition system (not shown) of the motorcycle or vehicle is energized. This stay-alive code prevents the magnetic coupling 200 from shutdown during a period when the ignition system of the motorcycle is energized and none of the lighting circuits of the vehicle are energized (for example, on a long, uneventful cruise on open road). Upon receipt of a shutdown signal, and verification that a code indicating a motorcycle lighting operation (e.g., a brake light, etc.) has not been received during the predetermined time interval, the encoding microprocessor 220 transmits this status to the magnetic-coupling 200. The decoding microprocessor 210 will then be programmed to go into an even lower-power consumption sleep mode upon the absence of the reception of a code for a predetermined period. Any valid code received from the H-field backscatter generator 100 will return the decoding microprocessor 210 to active mode from sleep mode.

H-field backscatter generator 100 and magnetic coupling 200 are made to withstand exposure to adverse ambient conditions, e.g. extremes of temperature, humidity, dust, vehicle fumes, etc. In one preferred embodiment, the circuit boards of H-field backscatter generator 100 and magnetic coupling 200 are provided with a suitable conformal protective coating such as epoxy, polyurethane, parylene, and the like. Such a coating seals the H-field backscatter generator 100 and magnetic coupling 200 from humidity, dirt and fumes, and helps make the unit resistant to vibration. Generator 100 and coupling 200 are made to withstand temperatures between about −20 degrees Fahrenheit to about 195 degrees Fahrenheit.

Referring again to FIG. 1B, decoding microprocessor 220 is programmed to provide a beep through speaker 230 to confirm that batteries 242 are in good working order, at startup and also when magnetic coupling 200 receives a lighting signal from H-field backscatter generator 100 for the first time after it is brought out of a sleep mode that has lasted more than a predetermined time, e.g., 1 hour. In one embodiment, if the batteries 242 have been drained lower than a preset limit, one of the LED's 291 will flash dimly until fresh batteries are put in the unit, and no audible confirmation will be heard when unit 200 comes out of sleep mode. When unit 200 is activated, it emits an audible beep when it first receives a lighting signal from generator 100 to signal that it is working and batteries 242 are within recommended charge specifications.

The manner in which the backscatter generator 100 and the magnetic coupling 200 of the applicants' safety lighting system 10 operate will now be described in more detail.

With regard to specifications, backscatter generator 100 and the magnetic coupling 200 require a power supply of between about 2.0 and about 3.8 volts, operate with a 1 $mV_{rms}$ sensitivity, a 1 microampere standby current during "sleep" mode, and communicate with a baud rate of up to about 4 kilobytes per second (ASK modulation).

The magnetic coupling receiver 200 preferably operates at 125 kHz. Magnetic coupling receiver 200 requires ultra-low power, which is used for the wake-up function of the sensitive input stage. Magnetic coupling receiver 200 amplifies and demodulates the carrier signal 190 from a small antenna coil 205 to a digital output signal for microcontroller 220. During the 1 microampere standby mode, a preamble detection unit in microprocessor/microcontroller 220 monitors the incoming signal 190 and activates the wake-up output and the data output on receiving a proper 125 kHz preemption signal.

Without a signal 190 present from generator/transmitter 100, magnetic coupling receiver 200 operates in a standby/listen mode. In this mode, magnetic coupling receiver 200 monitors the antenna input with very low current consumption. To bring receiver 200 and the connected control unit 220 out of sleep, the associated H-field backscatter generator transmitter 100 must send a preamble burst. After a correct preamble is detected, the receiver 200 is activated. It adapts the gain of the input stage and enables the wake-up and the data output The receiver 200 uses an Automatic Gain Control (AGC) amplifier to amplify the input signal from the antenna 205. The gain is adjusted by the automatic gain control circuit if a preamble signal is detected. The high dynamic range of the AGC enables the receiver to operate with input signals from 1 mVrms to 1.1 Vrms. After the AGC setting time, the amplifier output delivers a 125 kHz signal with an adjusted amplitude.

When no transmitter signal 190 is present, the receiver 200 stays in standby or listen or "sleep" mode. To prevent the receiver 200 from unintended operations in a noisy environment, the preamble detection circuit acts as a filter and checks the input signal. A valid signal is detected by fulfilling a predetermined sequence without interrupts. Very short interrupts, which are suppressed by a signal conditioner, are tolerated. When a valid preamble is found the circuit starts the automatic gain control. It requires several hundred carrier periods to settle. The complete preamble is only approximately 7 mS long.

To control the input signal 190, the receiver has a build-in digital AGC. The gain control circuit of receiver 200 regulates the internal signal amplitude to the reference value. It decreases the gain by one step if the internal signal exceeds the reference level for two periods and it increases the gain by one step if eight periods do not achieve the reference level. In the standby listen mode the gain is reset to the maximum value. If a valid preamble signal is detected, the automatic gain control is activated. With the variation of gain, the antenna input impedance changes.

The signal conditioner demodulates the amplifier output signal and converts it to a binary signal. It compares the carrier signal with the 50% reference level and delivers a logical 1, if the carrier signal stays below the reference and a logical 0, if it exceeds the reference level. A smoothing filter suppresses the space between the half-waves as well as a few missing periods in the carrier and glitches during the gaps.

The output signal of the signal conditioner is used as the internal data signal for the data output, the wake-up logic and the preamble detection. As the circuit does not check the received data except the preamble in sleep mode, current consumption by receiver 200 is minimal, resulting in long battery life. The receiver 200 triggers a wake-up signal only when it has detected the end of a preamble signal and has left the standby mode. As previously stated, in the standby listen mode, the receiver 200 monitors the antenna input with a very low current consumption. The automatic gain control is switched off at the time and the gain is set to the maximum value. Before the controller enters its standby mode after the communication, it activates the standby listen mode of the receiver.

Figure 4:
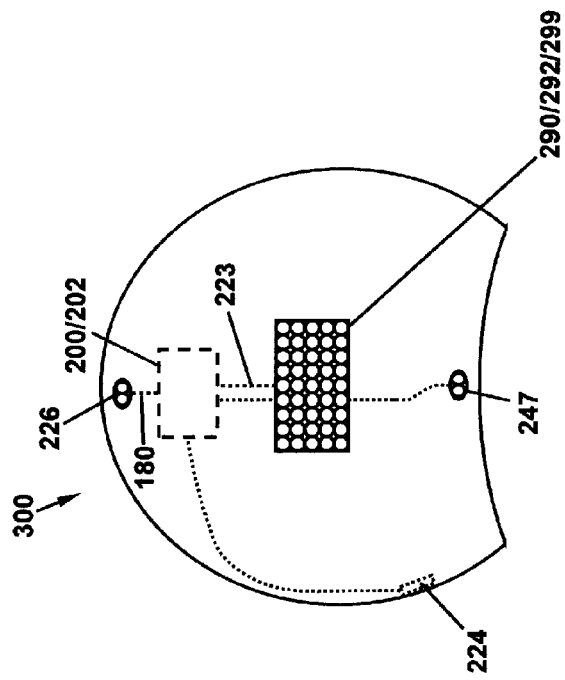
FIG. 4 is a rear view of the safety helmet assembly of FIG. 3.
Figure 3:
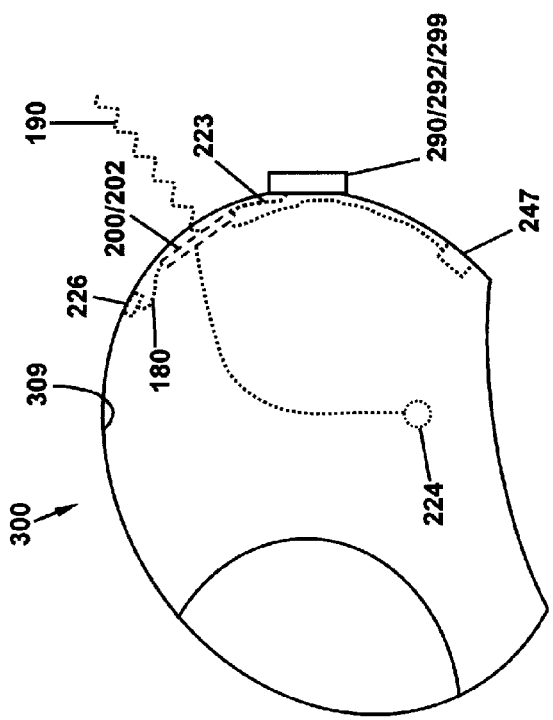
FIG. 3 is a side elevation view of a safety helmet assembly comprised of the safety lighting system of the present invention.

FIG. 3 is a side elevation view of a safety helmet assembly comprised of the safety lighting system of the present invention. FIG. 4 is a rear view of the safety helmet assembly of FIG. 3. Referring to FIG. 3 and FIG. 4, helmet 300 comprises magnetic coupling 200 for receiving signal 190 disposed on circuit board 202, which is embedded in helmet 300 proximate to the outer hard shell 309 thereof. In the embodiment depicted in FIGS. 3 and 4, circuit board 202 is a small thin rigid board embedded in helmet 300. In another embodiment (not shown), circuit board 202 is made on a thin flexible substrate and is formed with a similar curvature to the shell 309 of helmet 300.

Light group 290/light array 292 is disposed on the outside surface of helmet 300 and is secured thereto by suitable fastening means such as adhesive or Velcro® or brackets (not shown). (Such bracket mounting enables an easy transfer of light group 290/light array 292 between one or more helmets, such as e.g. when a motorcycle driver takes on a passenger, light group 290/light array 292 is transferred from the helmet of the driver to the helmet of the passenger and continues to provide enhanced safety.) Light group 290/light array 292 is connected to magnetic coupling 200 by conductors 223. Power supply charging jack 247 is provided in the shell 309 of helmet 300, and is connected to magnetic coupling 200. Toggle switch 224, the function of which has been described previously herein, is also provided in the shell 309 of helmet 300, and is connected to magnetic coupling 200.

Figure 6:
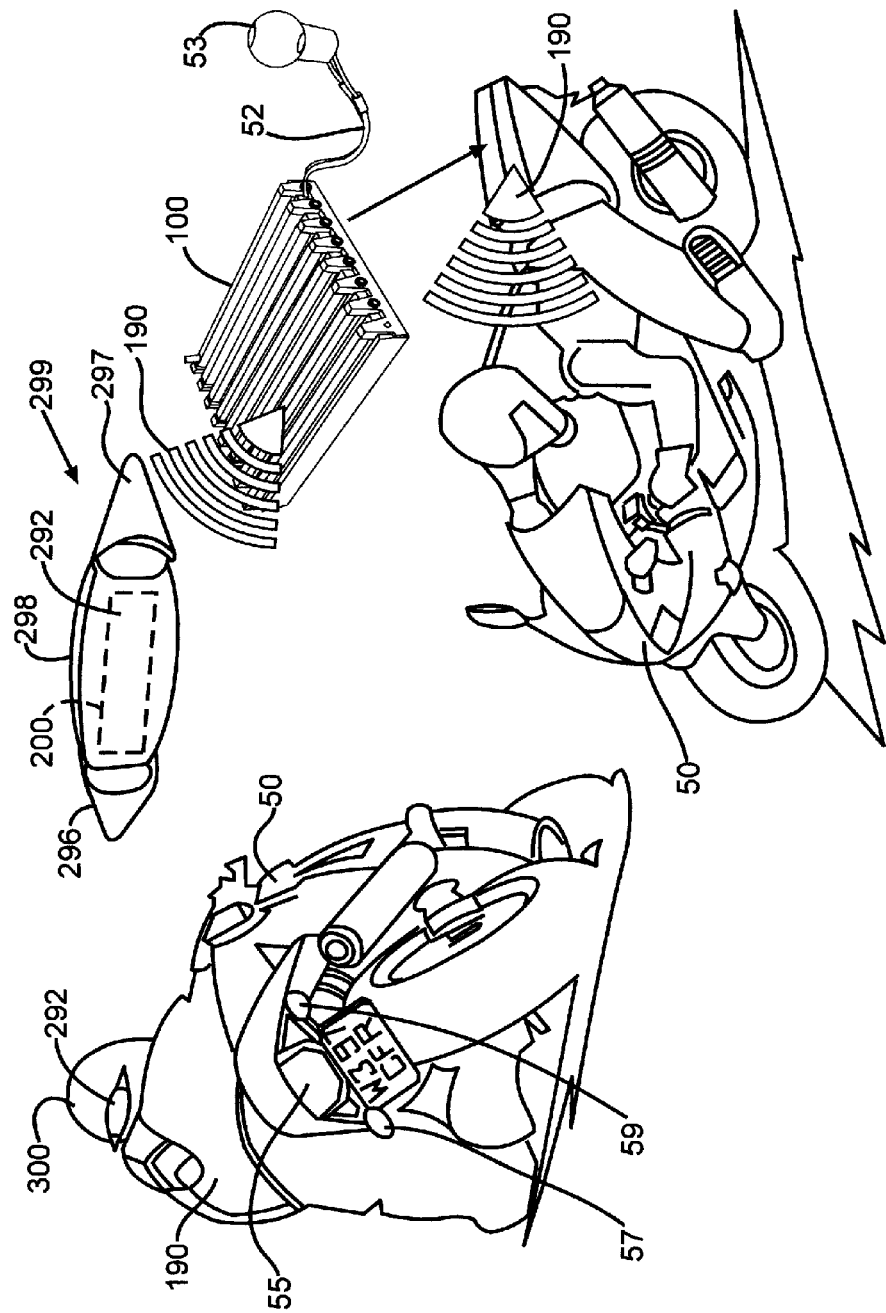
FIG. 6 is an illustration of one use of the lighting system of the present invention in which the lighting functions within a tail light in a motorcycle are detected and encoded, transmitted to a receiver in a motorcycle helmet, and replicated by a light on a motorcyclist's safety helmet.

In another embodiment described subsequently herein and shown in FIG. 6, magnetic coupling 200 is integrated into the base 298 (see FIG. 6) of a receiver/lighting assembly 299 rather than within the helmet 300 of the rider. In a further embodiment, receiver/lighting assembly 299 comprises directional lights 296 and 297 as indicated in FIG. 6.

Referring again to FIG. 3 and FIG. 4, a cord 180 is connected to magnetic coupling to provide programming capability thereof as described previously herein. In the embodiment depicted in FIGS. 3 and 4, socket 226 is provided in the shell 309 of helmet 300, rather than on circuit board 202, as described previously and shown in FIG. 1B.

It is to be understood that the arrangement of the respective components shown in FIGS. 3 and 4 is for illustrative purposes only, and that many other suitable arrangements of such components may be provided and give satisfactory function and performance in the applicants' safety lighting system. The exception to this is that it is highly preferable that lighting 290/292/299 be disposed on the rearward surface of helmet 300.

Figure 5A:
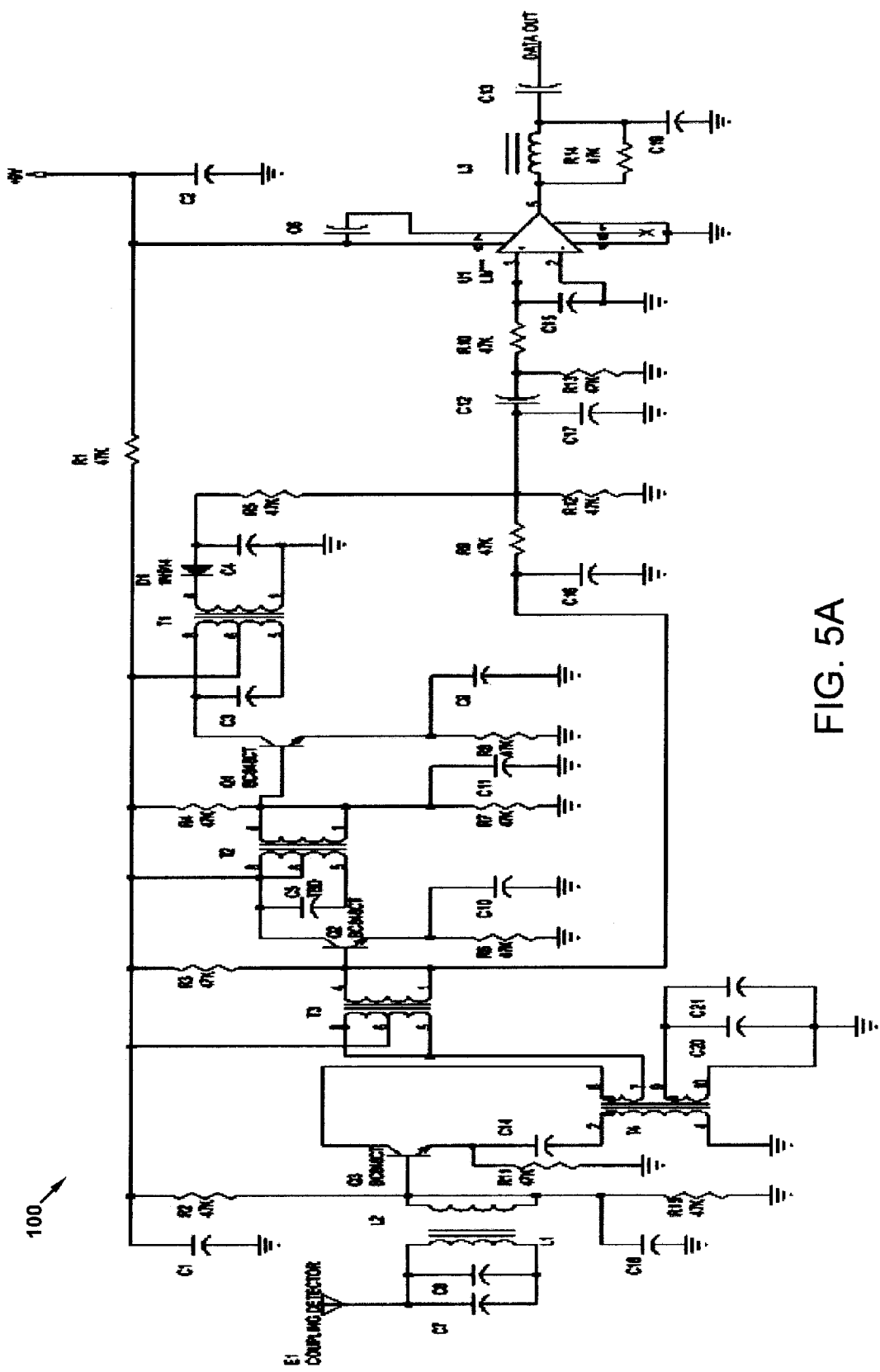
FIG. 5A is a circuit diagram of one embodiment of the H-field backscatter generator transmitter of the safety lighting system of the present invention.
Figure 5B:
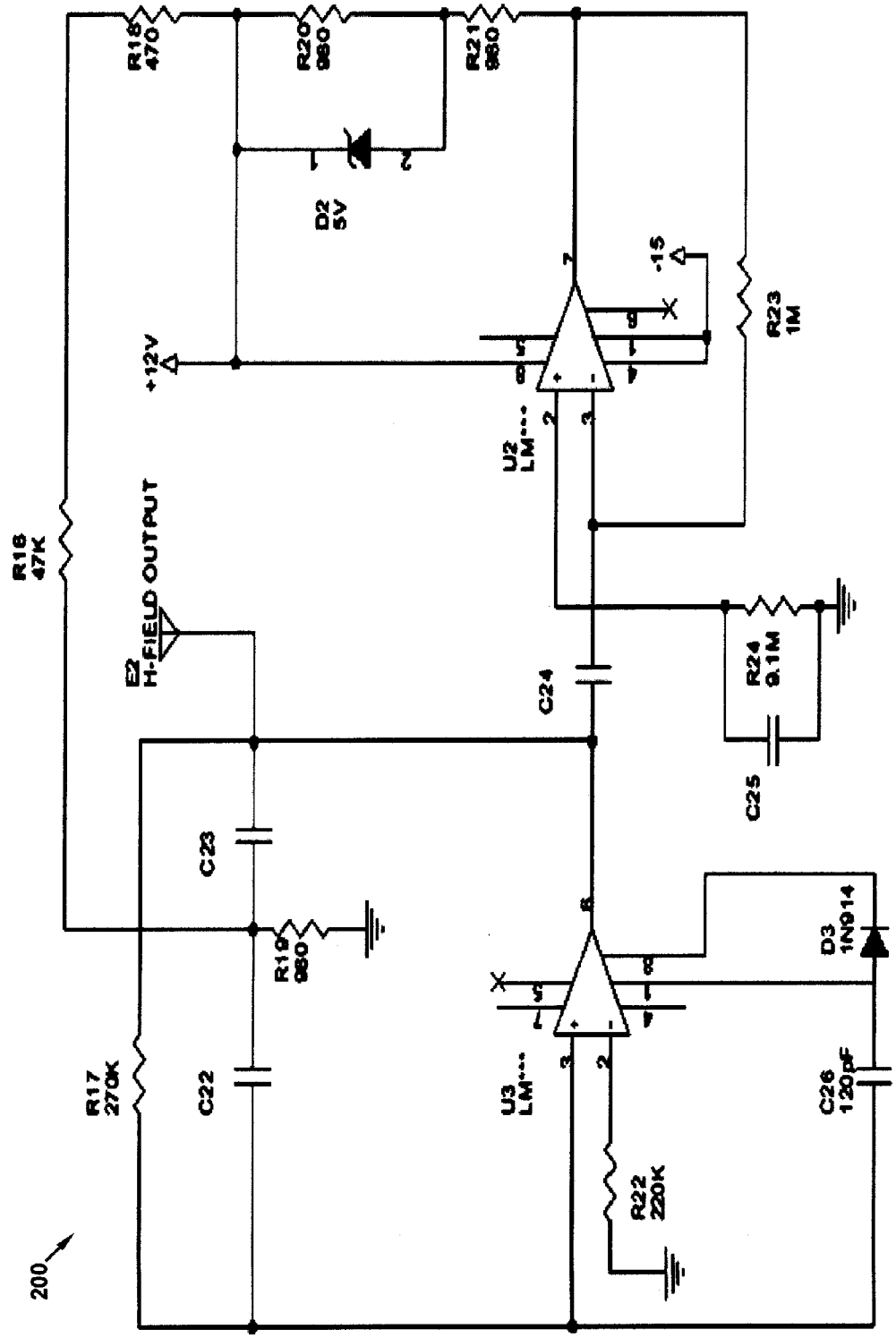
FIG. 5B is a circuit diagram of one embodiment of the magnetic coupling receiver of the safety lighting system of the present invention.

FIG. 5A is a circuit diagram of one embodiment of the H-field backscatter generator transmitter 100 of the safety lighting system of the present invention, and FIG. 5B is a circuit diagram of one embodiment of the magnetic coupling receiver circuitry of the safety lighting system of the present invention.

FIG. 6 is an illustration of one use of the lighting system of the present invention in which the lighting functions within a tail light in a motorcycle are detected and encoded, transmitted to a receiver in a motorcycle helmet, and replicated by a light on a motorcyclist's safety helmet. Referring to FIG. 6, motorcycle 50 is equipped with a brake light 55 having at least one lamp 53 (see also FIG. 1A) contained therein. In one embodiment, when the brake light 55/lamp 53 is activated, the radiation from such lamp 53 activates photocell 151 (see FIG. 1A) connected to H-field backscatter generator/transmitter 100 which is disposed onboard motorcycle 50 as described previously. Alternatively, circuit wiring 52 of lamp 53 is electrically connected to inductor or voltage detector 152 of H-field backscatter generator/transmitter 100, which detects a change in either voltage and/or current and/or inductance and/or other property(s). In either case, the lighting of lamp 53 or the application of electrical power to circuit 52 is detected by generator/transmitter 100.

Generator/transmitter 100 communicates a signal 190 to magnetic coupling system 200, which illuminates lighting array 292 as described previously. In the embodiment depicted in FIG. 6, magnetic coupling system 200 (shown in phantom) is integrated into the base 298 of a receiver/lighting assembly 299 rather than within the helmet 300 of the rider. Such receiver lighting assembly 299 is secured to the rear of helmet 300 by adhesive, Velcro®, or other suitable fastening means. Receiver/lighting assembly further comprises left directional lamp 296 and right directional lamp 297, which are operated in concert with left directional lamp 57 and right directional lamp 59 of motorcycle 50. Left directional lamp 296 and right directional lamp 297 are preferably amber in color, and are capable of sequencing a V pattern in the rows of LED's therein.

In one embodiment, such receiver/lighting assembly 299 is removably attached to helmet 300, by Velcro, snaps, brackets, other suitable easily fastened and unfastened securing means. In this manner, receiver/lighting assembly 299 can be easily removed from a first helmet and attached to a second helmet.

In another embodiment (not shown), a magnetic circuit is activated when the mechanical part that is moved in order to activate the brake mechanism (not shown) is in fact moved. The movement of this part past a sensor (such as, e.g., a magnetic reed switch) preferably activates a magnetic circuit (not shown) that, in turn, activates the lighting array 292.

In one embodiment, the signals generated by the transmitter/generator 100, and received by the magnetic coupling receiver 200, are substantially below the radio frequency range and at a power level that does not require licensing by the Federal Communications Commission.

Figure 7:
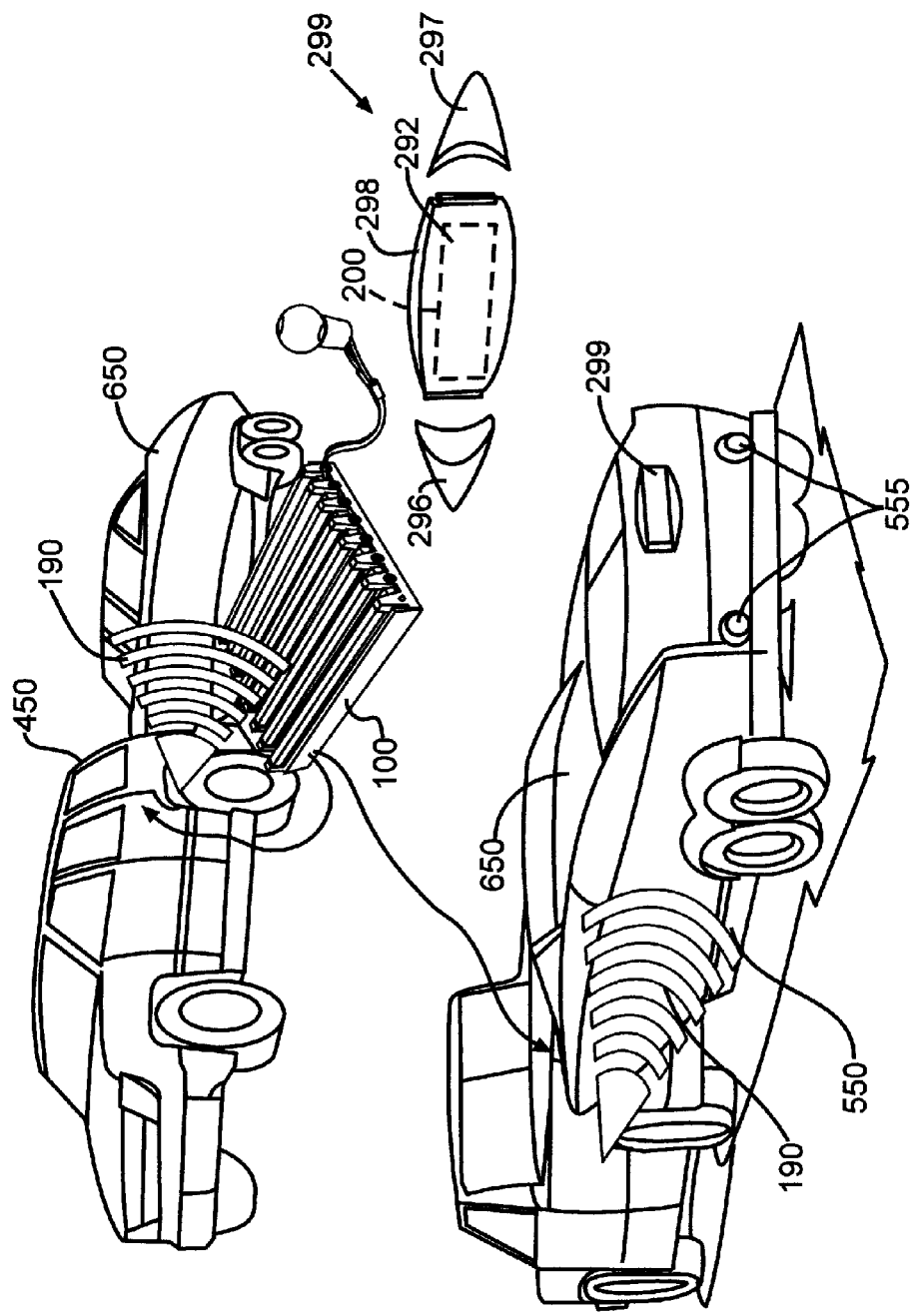
FIG. 7 is an illustration of one use of the lighting system of the present invention in which the lighting functions within a tail light in a trailer are detected and encoded, transmitted to a receiver in a remote light assembly, and replicated by a light contained in such remote light assembly.

FIG. 7 is an illustration of one use of the lighting system of the present invention in which the lighting functions within one or more tail lights in a trailer are detected and encoded, transmitted to a receiver in a remote light assembly, and replicated by a light contained in such remote light assembly. Referring to FIG. 7, the applicants' safety lighting system comprises generator/transmitter 100 on board vehicle 450, and receiver/lighting assembly 299 disposed on trailer 550, or on an object such as boat 650 on trailer 550.

Generator/transmitter 100 is installed to detect the operation of the rear lights (not shown) of vehicle 450 in substantially the same manner as was described previously for motorcycle 50 (see FIG. 1A and FIG. 6). Receiver lighting assembly 299 is secured high up on the back of boat 650 by adhesive or other suitable means. Receiver lighting assembly 299 operates in substantially the same manner as was described previously for the various helmet lighting magnetic coupling systems 200 described herein. In the embodiment depicted in FIG. 7, left directional indicator 296 and right directional indicator 297 are separable from lamp array 292, and are connected to magnetic coupling by short lengths of wiring (not shown). Alternatively, each of left directional indicator 296 and right directional indicator 297 could further comprise individual magnetic couplings, and operate in a manner similar to that described herein where several magnetic couplings are operated by one transmitter/generator 100.

Figure 8:
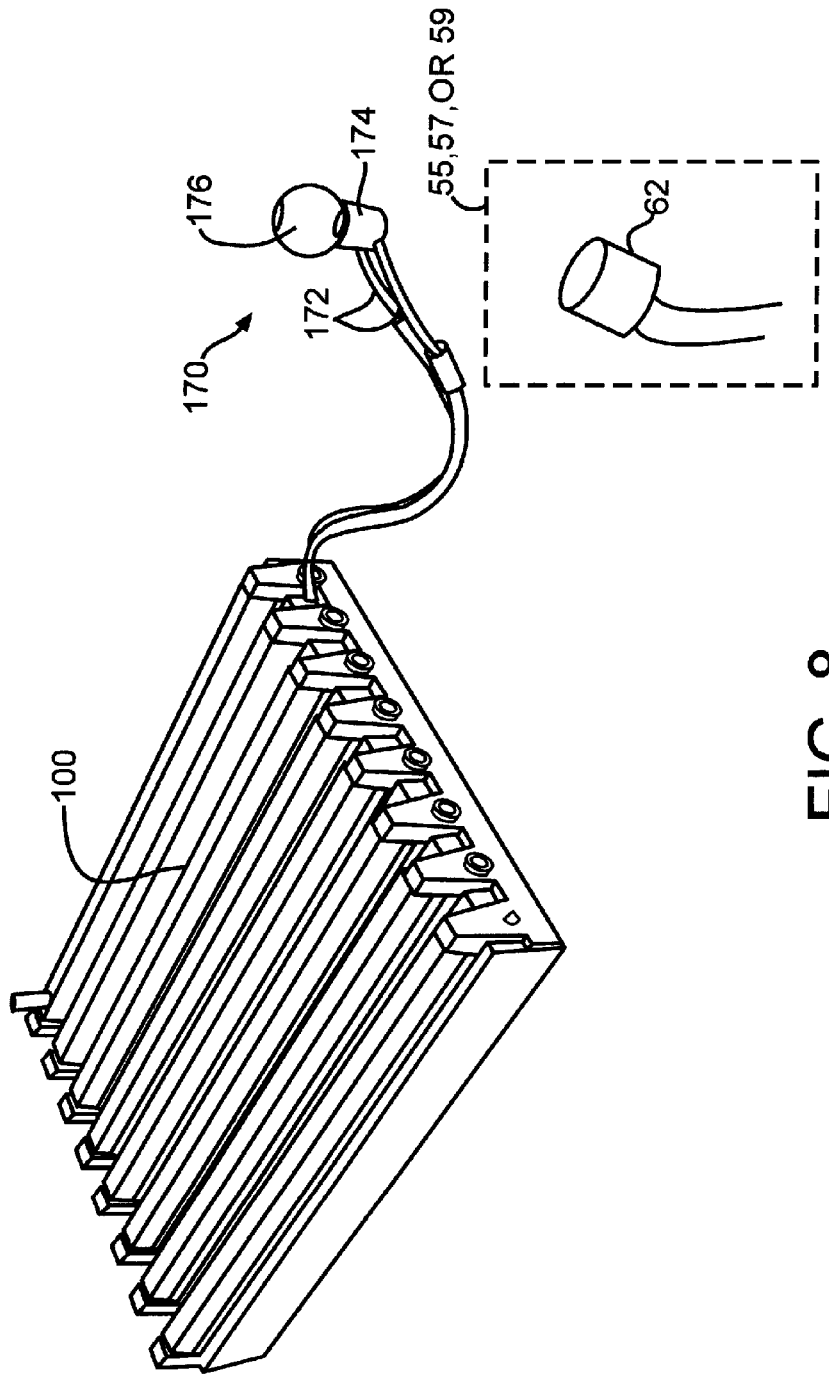
FIG. 8 is an illustration of one subassembly of the present invention wherein a generator/transmitter is electrically connected to a pigtailed lightbulb, such subassembly being useful in various embodiments of the invention The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

FIG. 8 is an illustration of one subassembly of the present invention wherein a generator/transmitter is electrically connected to a pigtailed light bulb, such subassembly being useful in various embodiments of the invention. Referring to FIG. 8, generator/transmitter 100 is electrically connected to a pigtailed light bulb fitting 170. Light bulb fitting 170 preferably comprises quick-disconnect pigtail wires 172 connected to a socket 174, in which is fitted bulb 176. Socket 174 is adapted to be disposed within the socket 62 of any one of lights 55, 57, or 59 (see FIG. 6) of the motorcycle 50 in lieu of the regular light bulb disposed therein, with the wiring 172 from socket 174 located further up on socket 174 if necessary to obtain a fit of socket 174 in socket 62. In operation, when the particular circuit operating light 55, 57, or 59 is actuated, bulb 176 of pigtailed light bulb fitting 170 is illuminated, and the presence of electrical power through pigtail wires 172 is detected by transmitter/generator 100, which then transmits a signal to a magnetic coupling as described herein.

Pigtailed light bulb fitting 170 has the advantage of being easily connected to any lamp socket on a vehicle that accepts standard automotive lamps. When pigtailed light bulb fitting 170 is connected as described, the particular lamp of the vehicle remains functional, since bulb 176 will illuminate, and a signal of such lighting is provided to generator transmitter 100. Pigtailed light bulb fitting 170 is easily connected to any lamp socket without disturbing or cutting/splicing into the wiring of the vehicle, in contrast to typical prior art methods and devices for temporarily connecting to vehicle wiring.

In the embodiment depicted, the generator/transmitter 100 is miniaturized and is disposed within the housing of light 55, 57, or 59, without obstructing the emanation of light therefrom. As was described previously, generator/transmitter 100 is made to be resistant to any heat absorbed from such lights. Generator/transmitter 100 is made moisture resistant and water tight, and in one embodiment is potted into a thick film or coating, with connection wires protruding therefrom with a quick disconnect fitting to connect generator/transmitter 100 to pigtail wiring device 170 or other suitable connection fitting to the vehicle power supply.

As will be apparent, the pigtail assembly 170, and the generator/transmitter 100 may be disposed in or on other portions of the motorcycle 50 or vehicle 450 (see FIG. 7). Alternatively, or additionally, one or more of these components may be disposed on or in, and/or used in conjunction with, many vehicles such as automobiles, trucks, bicycles, utility trailers, recreational trailers, and the like. In a simplified embodiment, the system provides a wireless brake light comprising only a single lamp. For any of these embodiments, the generator/transmitter 100 is preferably directly connected into the approximately 12 volt power supply of the vehicle. In the event that the generator/transmitter 100 is connected to the newer 42 volt vehicle power system, a step-down transformer (not shown) may be provided to reduce the supplied voltage to the circuits on circuit board 102 of generator/transmitter 100.

In summary, the numerous advantages of the applicants' safety lighting system described herein may be summarized as follows:

The applicants' lighting system utilizes Backscatter Magnetic Pulse Technology, which is safe, efficient and not impacted by infrared or radio frequency noise often found in urban areas, as opposed to prior art devices that use infrared and standard radio frequency communication, both of which are highly susceptible to sunlight and other electromagnetic interference.

The applicants' magnetic coupling is provided with no case penetration (for switches and/or charging connections) to enable water/moisture/dust penetration.

The applicants' generator/transmitter and magnetic coupling receiver use electronics circuitry that effectively has no impact on battery drain. Battery drain is essentially only caused during the time that the lighting LED's are illuminated. This enables the use of brighter LED's, longer battery life and a safer unit that a user cannot mistakenly turn off or leave off, thereby avoiding the potentially dangerous error of not turning the unit on. There is no on/off switch provided to disable the system. The magnetic coupling receiver unit of the applicants' system is essentially always on.

The unit is provided with automatic diagnostics that test function, LEDs and battery life after waking from extended sleep. An audible "chirp" or "beep" tells the driver that all systems are functioning.

In addition to the audible tone, the helmet unit lights a center LED in the lighting display dimly when battery power levels drop below acceptable levels to alert the driver of the need to replace batteries.

The applicants' system may provides hundreds of thousands of unique codes to insure that non-related units do not interfere with each other.

The applicants' system provides a temporary override feature, operated e.g., by a magnetic key fob, to disable the driver's helmet light when traveling with a passenger. The driver's helmet light automatically resets to normal operation after pre-set period of inactivity, which eliminates operator error and having unit remain disabled unintentionally.

It is, therefore, apparent that there has been provided, in accordance with the present invention, a safety lighting system comprising an H-field backscatter generator adapted to receive at least one electrical signal indicating the application of electrical power to at least one light circuit and comprising means for encoding and transmitting at least one encoded signal; a magnetic coupling receiver located separately from said H-field backscatter generator and adapted to receive said first encoded signal; and a light display electrically connected to said magnetic coupling receiver, said light display comprising at least one illuminatable lamp. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An auxiliary safety lighting system for a vehicle comprising:
   a. an H-field backscatter generator system including:
      i. an encoding microprocessor electrically connectable to at least one light circuit; and
      ii. an H-field backscatter signal generator modulated by said encoding microprocessor and adapted to generate at least one encoded electrical signal indicating the application of electrical power to said at least one light circuit;
   b. a magnetic coupling receiver system located separately from said H-field backscatter generator system, said magnetic coupling receiver system including:
      i. a demodulator in wireless communication with said H-field backscatter signal generator and adapted to receive said at least one encoded signal; and
      ii. a decoding microprocessor electrically connected to said demodulator; and
   c. a light display electrically connected to said decoding microprocessor, said light display comprising at least one illuminatable lamp.

2. The safety lighting system as recited in claim 1, wherein said H-field backscatter generator system further comprises an encoding microprocessor.

3. The safety lighting system as recited in claim 2, wherein said encoding microprocessor encodes said at least one encoded signal as an identification code.

4. The safety lighting system as recited in claim 3, wherein said encoding microprocessor encodes a second encoded signal to indicate the occurrence of said application of electrical power to said at least one light circuit.

5. The safety lighting system as recited in claim 4, wherein said magnetic coupling receiver system further comprises a decoding microprocessor.

6. The safety lighting system as recited in claim 5, wherein said decoding microprocessor decodes said at least one encoded signal and establishes a communication link to said H-field backscatter generator system.

7. The safety lighting system as recited in claim 6, wherein said decoding microprocessor causes the illumination of said at least one illuminatable lamp.

8. The safety lighting system as recited in claim 1, wherein said H-field backscatter generator system is disposed upon a motorcycle comprising a tail light, and said light circuit is a tail light circuit of said motorcycle.

9. The safety lighting system as recited in claim 8, wherein said magnetic coupling receiver system is disposed on a safety helmet.

10. The safety lighting system as recited in claim 9, wherein said light display is disposed upon the exterior surface of said safety helmet.

11. The safety lighting system as recited in claim 10, wherein said at least one illuminatable lamp is a light emitting diode.

12. The safety lighting system as recited in claim 10, wherein said light display comprises an array of lamps.

13. The safety lighting system as recited in claim 12, wherein said H-field backscatter generator system is adapted to receive electrical signals from said tail light of said motorcycle indicating the application of electrical power to a brake circuit of said motorcycle, a left turn circuit of said motorcycle, a right turn circuit of said motorcycle, and a running light circuit of said motorcycle.

14. The safety lighting system as recited in claim 13, wherein said decoding microprocessor causes said light display to illuminate indicatively in concert with said application of electrical power to a brake circuit of said motorcycle, a left turn circuit of said motorcycle, a right turn circuit of said motorcycle, and a running light circuit of said motorcycle.

15. A safety lighting system for enhanced safety of a rider of a motorcycle, said system comprising:
   a. an H-field backscatter generator system disposed upon a motorcycle and including:
      i. an encoding microprocessor electrically connectable to at least one light circuit of the motorcycle; and
      ii. an H-field backscatter signal generator modulated by said encoding microprocessor and adapted to generate at least one encoded electrical signal indicating the application of electrical power to said at least one light circuit of said motorcycle;
   b. a magnetic coupling receiver system disposed in a safety helmet, said magnetic coupling receiver system including:
      i. a demodulator in wireless communication with said H-field backscatter signal generator and adapted to receive said at least one encoded signal;
      ii. a decoding microprocessor electrically connected to said demodulator; and
   c. a light display electrically connected to said decoding microprocessor, said light display disposed upon the outside surface of said helmet and comprising at least one illuminatable lamp.

16. The safety lighting system as recited in claim 15, wherein said H-field backscatter generator system further comprises an encoding microprocessor.

17. The safety lighting system as recited in claim 16, wherein said encoding microprocessor encodes said at least one encoded signal as an identification code.

18. The safety lighting system as recited in claim 17, wherein said encoding microprocessor encodes a second encoded signal to indicate the occurrence of said application of electrical power to said at least one light circuit of said motorcycle.

19. The safety lighting system as recited in claim 18, wherein said magnetic coupling receiver system further comprises a decoding microprocessor.

20. The safety lighting system as recited in claim 19, wherein said decoding microprocessor decodes said at least one encoded signal and establishes a communication link to said H-field backscatter generator system.

21. The safety lighting system as recited in claim 20, wherein said decoding microprocessor causes the illumination of said at least one illuminatable lamp.

* * * * *